US012438289B2

(12) United States Patent
Morello et al.

(10) Patent No.: US 12,438,289 B2
(45) Date of Patent: Oct. 7, 2025

(54) WIRE ASSEMBLY WITH WELDED CONTACT

(71) Applicant: Aptiv Technologies AG, Schaffhausen (CH)

(72) Inventors: John R. Morello, Warren, OH (US); James M. Rainey, Warren, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 0 days.

(21) Appl. No.: 18/624,790

(22) Filed: Apr. 2, 2024

(65) Prior Publication Data

US 2024/0250453 A1 Jul. 25, 2024

Related U.S. Application Data

(63) Continuation of application No. 18/144,604, filed on May 8, 2023, now abandoned, which is a continuation of application No. 17/371,275, filed on Jul. 9, 2021, now Pat. No. 11,682,849.

(51) Int. Cl.
*H01R 4/02* (2006.01)
*H01R 4/58* (2006.01)

(52) U.S. Cl.
CPC ............... *H01R 4/023* (2013.01); *H01R 4/58* (2013.01)

(58) Field of Classification Search
None
See application file for complete search history.

(56) References Cited

U.S. PATENT DOCUMENTS

| | | | | |
|---|---|---|---|---|
| 4,038,743 | A * | 8/1977 | DuRocher .............. | H01R 4/026 228/904 |
| 5,037,329 | A | 8/1991 | Wright | |
| 8,563,861 | B2 * | 10/2013 | Van Swearingen .... | H01R 43/02 439/578 |
| 9,099,797 | B1 | 8/2015 | Duesterhoeft et al. | |
| 9,960,550 | B2 * | 5/2018 | Ensley ................... | H01R 24/38 |
| 2004/0137790 | A1 | 7/2004 | Lee et al. | |
| 2012/0129383 | A1 | 5/2012 | Swearingen | |
| 2015/0332809 | A1 | 11/2015 | Natoli et al. | |
| 2018/0026408 | A1 | 1/2018 | Ensley et al. | |
| 2020/0295477 | A1 | 9/2020 | Gruber | |
| 2022/0352652 | A1 | 11/2022 | Yudate | |

FOREIGN PATENT DOCUMENTS

CN 213520365 U 6/2021

OTHER PUBLICATIONS

"Extended European Search Report received in European application No. EP22186619.7 mailed on Apr. 13, 2023", 12 Pages.

* cited by examiner

*Primary Examiner* — Ross N Gushi
(74) *Attorney, Agent, or Firm* — Billion & Armitage

(57) ABSTRACT

A coaxial cable assembly includes an inner conductor having an outer circumferential surface, wherein the inner conductor terminates in a tip having a planar surface substantially perpendicular to a longitudinal axis of the inner conductor. The coaxial cable assembly further includes an insulator located around the outer circumferential surface of the inner conductor and a contact welded to the planar surface of the tip of the inner conductor.

19 Claims, 6 Drawing Sheets

WIRE ASSEMBLY WITH WELDED CONTACT

CROSS REFERENCE

This application is a continuation of U.S. application Ser. No. 18/144,604, filed May 8, 2023, which is a continuation of U.S. application Ser. No. 17/371,275, filed on Jul. 9, 2021, now U.S. Pat. No. 11,682,849, which are incorporated by reference in its entirety.

FIELD

The present disclosure is directed to a wire assembly and in particular to a wire assembly that includes a contact welded to an inner conductor of the wire assembly.

BACKGROUND

Wire connector assemblies—for example, coaxial cable connector assemblies—have been used for numerous automotive applications, such as navigation systems, infotainment systems, air bag systems, and other data transmission systems. A typical wire may include an inner conductor surrounded by a jacket. A typical coaxial cable includes an outer shield conductor, an inner center conductor, a dielectric, and an insulation jacket. The outer conductor and the inner conductor of the coaxial cable often electrically interface with a mating coaxial cable through a coaxial connector assembly. Radio Frequency (RF) connectors most often referred to simply as RF connectors are often used to connect coaxial cables while providing a certain degree of shielding. The use of RF connectors for coaxial cable has greatly increased in automotive applications as devices requiring high speed data communication continue to proliferate.

Typically, contacts connected to the inner conductor of a coaxial cable are mechanically adhered to the cable via crimping or soldering of the inner conductor to the contact. For example, a contact may comprise several wings that are wrapped around the inner conductor and crimped onto the conductor to ensure an electrical and mechanical connection between the contact and the inner conductor. The contact may include a pin or terminal configured to interface with a terminal assembly to provide electrical contact between the inner conductor of the coaxial cable and the terminal assembly. The contacts are often non-rigid and compliant and require orientation with respect to the coaxial cable during the crimping (or soldering) operation. It would be beneficial to develop a contact that does not utilize crimping and/or soldering between the contact and the inner conductor of the coaxial cable while being capable of interfacing with a terminal assembly.

SUMMARY OF THE INVENTION

According to one aspect, a wire assembly includes an insulated wire and a contact. The cable includes at least an inner conductor and an insulating jacket surrounding the inner conductor, wherein a tip of the inner conductor is exposed at a first end. The contact is welded to the tip of the inner conductor at the first end.

According to another aspect, a coaxial connection assembly includes a coaxial cable and a terminal assembly. The coaxial cable includes an inner conductor, a dielectric insulator, an outer conductor and a jacket, wherein the outer conductor and the jacket are stripped from a first end, wherein at least a tip of the inner conductor is exposed at the first end. A contact is welded to the tip of the inner conductor at the first end. The outer terminal assembly includes a first opening for receiving the first end of the coaxial cable assembly, wherein the outer terminal includes a first insulator located within the outer terminal assembly configured to receive the welded contact of the coaxial cable assembly.

DETAILED DESCRIPTION

The present disclosure is directed to a wire assembly and in particular to a wire assembly that includes a contact welded to an inner conductor of the wire assembly. A wire assembly includes at least an inner conductor surrounded by an insulating jacket. In some embodiments, a first end of the wire is cut to expose a tip portion of the inner conductor, wherein the contact is welded to the tip portion of the inner conductor. In some embodiments, the tip portion is non-oriented, meaning that the contact does not need to be oriented during welding of the contact to the tip portion of the inner conductor. In some embodiments, the wire assembly is a coaxial wire assembly.

Figure 1A:
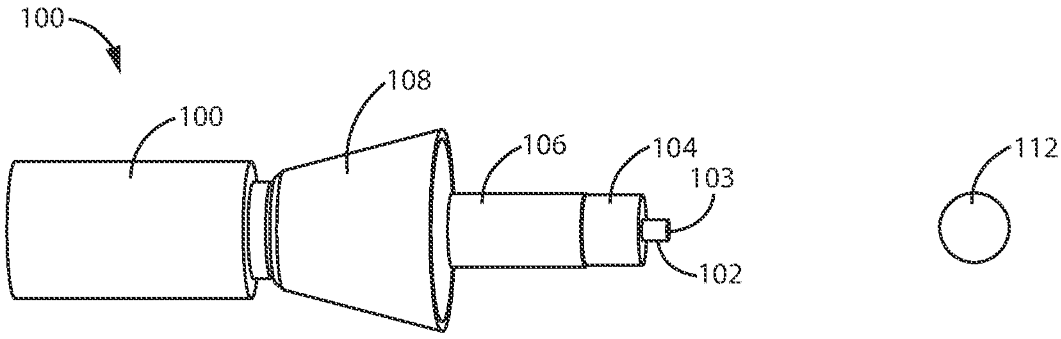
FIG. 1A is a side view of a coaxial cable assembly and welded contact according to some embodiments.
Figure 1B:
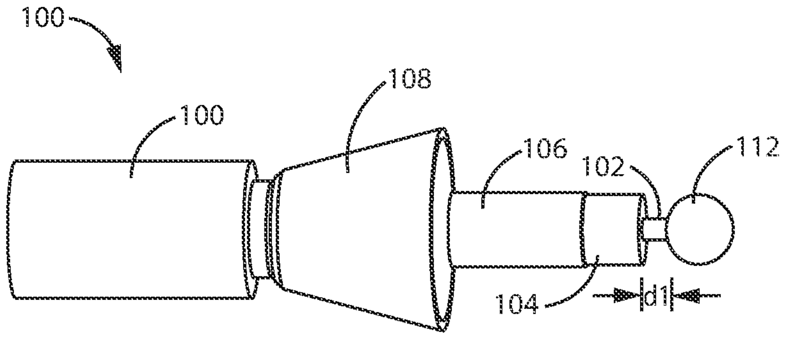
FIG. 1B is a side view of a center core of the coaxial cable assembly welded to the contact according to some embodiments.

FIGS. 1A and 1B are side views of a coaxial cable assembly 100 and welded contact 112 according to some embodiment. In some embodiments, coaxial cable assembly 100 includes an inner conductor 102, dielectric insulator 104, foil shield 106, outer conductor 108 and jacket 110. Contact 112 is a conductive contact configured to be welded to the inner conductor 102. Although a coaxial cable assembly is shown in FIGS. 1A and 1B, the discussion is applicable to a simple wire assembly that includes only an inner conductor and an insulating jacket. In addition, the embodiment shown in FIGS. 1A and 1B illustrate a coaxial cable assembly having, for example, a foil shield. In some embodiments, a coaxial cable assembly does not require a separate foil shield.

In some embodiments, a portion of dielectric insulator 104 (as well a portion of the foil shield 106, if included, outer conductor 108, and jacket 110) is cut or stripped to expose a tip portion 103 of the inner conductor 102. In some embodiments, the tip portion is in a plane substantially perpendicular to the longitudinal axis of the wire or coaxial cable. In some embodiments, only the tip portion 103 of the inner conductor 102 is exposed (i.e., no circumferential surface of the inner conductor 102). Contact 112 is then welded to the tip portion 103 of the inner conductor 102, with no portion of the contact 112 contacting the outer circumference of the inner conductor 102. In other embodiments, a portion of the dielectric insulator 104 is stripped from the inner conductor, exposing a length of the inner conductor 102. In some embodiments, the length of dielectric insulator 104 stripped from the inner conductor 102 is represented by the length d1 as shown in FIG. 1A. Contact 112 is welded to the tip portion 103 of the inner conductor 102 as shown in FIG. 1B. In some embodiments, the contact 112 again is only in contact with the tip portion 103 of the inner conductor 102, although at least a portion of the outer circumference of the inner conductor 102 may be exposed.

As compared with typical crimping operation—which require a longer length of the dielectric insulator to be stripped from the inner conductor for receiving the contact—the embodiment shown in FIGS. 1A and 1B allows for a very short length of dielectric insulator 104 to be stripped. For example, in some embodiments the length d1 is equal to or less than 1.0 millimeters (mm). In some embodiments, the length d1 is equal to or less than 0.7 mm. In some embodiments, the dielectric insulator 104 and inner conductor 102 are cut to the same length, which results in the length d1 being equal to zero. In some embodiments, the distance d1 between the end or stripped portion of the dielectric insulator 104 and the end of the inner conductor 102 is based on the geometry of the terminal assembly with which the coaxial cable assembly 100 interacts. Decreasing the length d1 improves the performance of the coaxial connection. In particular, impedance mismatches introduced by the relatively long interface associated with the inner conductor and a crimped contact are reduced as a result of the relatively short interface made possible by the welded contact 112. The reduction in impedance mismatches improves the RF performance of the interface between the coaxial assembly and the outer terminal assembly (shown in FIGS. 2A-2D).

In some embodiments, the welded contact 112 comprises a material that is rigid and/or non-compliant. In some embodiments, at least the surface of the welded contact 112 is conductive. For example, in some embodiments the welded contact 112 is a rigid, gold-plated contact. In other embodiments, other types of conductors may be utilized, either with respect to the entire contact 112 or the surface of the welded contact 112.

In some embodiments, the welded contact 112 is a non-oriented contact (i.e., does not need to be oriented with respect to the coaxial cable assembly 100 or inner conductor 102). For example, in the embodiment shown in FIGS. 1A and 1B the welded contact 112 is spherical in shape and can be welded to the inner conductor 102 in any orientation. In other embodiments, the welded contact 112 may be symmetrical about an axis or plane. For example, welded contact 112 may be conical in shape, wherein the base is placed in contact with the inner conductor 102. In this embodiment, the welded contact 112 may require orientation along one axis or plane (e.g., to place the base of the cone in contact with the inner conductor 102) but does not require orientation along the other axes or planes due to the symmetry of the contact along that axis or plane. In other embodiments, the welded contact 112 may have a geometry or shape that requires orientation with the coaxial cable assembly 100 (for example, contact 112 may have a non-symmetrical shape that requires orientation along all axes or planes relative to the coaxial cable assembly 100).

In embodiments in which the welded contact 112 is non-oriented (e.g., spherical), the diameter of the welded contact 112 may be selected based on the application. In some embodiments, the diameter of the welded contact 112 is smaller than the diameter of the inner conductor 102 to which it is welded. In other embodiments, the diameter of the welded contact 112 is greater than the diameter of the inner conductor 102, but smaller than the diameter of the dielectric insulator 104. In other embodiments, the diameter of the welded contact 112 is greater than the diameter of both the inner conductor 102 and the dielectric insulator 104. In some embodiments, the diameter of the welded contact 112 is based on the geometry of the terminal assembly that seats the welded contact 112 during operation. In some embodiments, percussion welding is utilized to weld the inner conductor 102 to the contact 112. One of the benefits of percussion welding is the manufacturability of percussion welded elements and corresponding low cost associated with percussion welding. For example, the contact 112 may be welded to the inner conductor 102 via an automated process. However, in other embodiments, other forms of welding may be utilized to mechanically secure the inner conductor 102 to the contact 112. In some embodiments, welding of the inner conductor 102 to contact 112 provides a joint greater in strength than that associated with inner conductor 102.

Figure 2A:
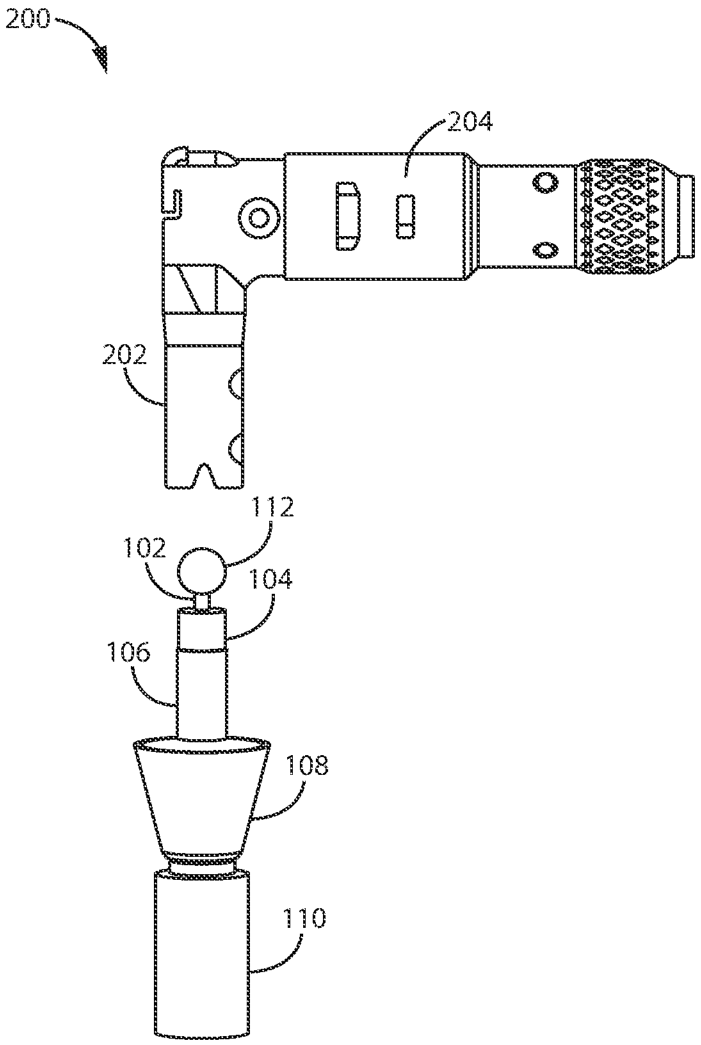
FIG. 2A is a side view of an outer terminal assembly and a coaxial cable assembly having a welded contact according to some embodiments.
Figure 2B:
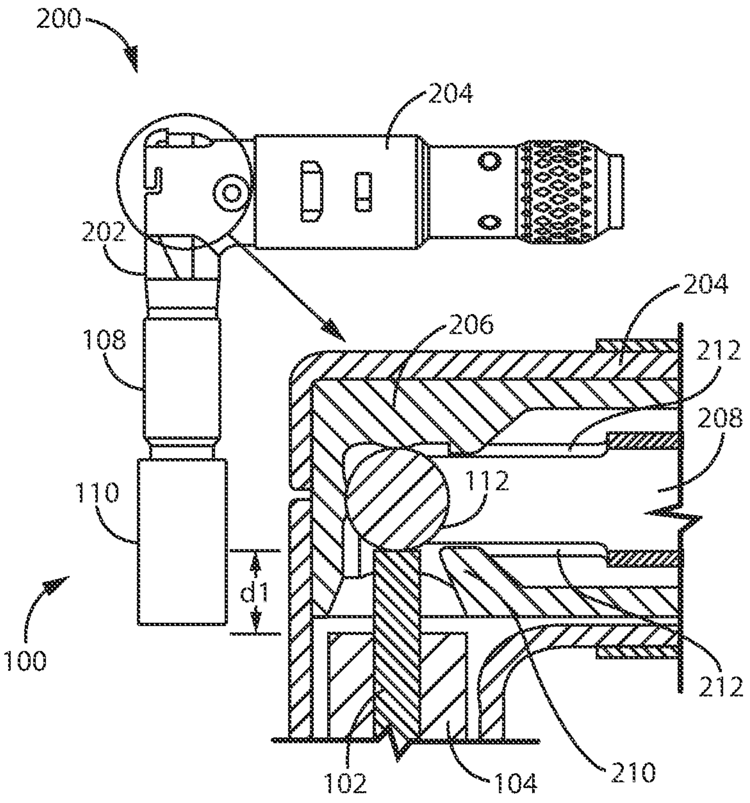
FIG. 2B is a side view of the outer terminal assembly mated with the coaxial cable assembly and a magnified cross-sectional view illustrating seating of the welded contact within the outer terminal assembly according to some embodiments.
Figure 2C:
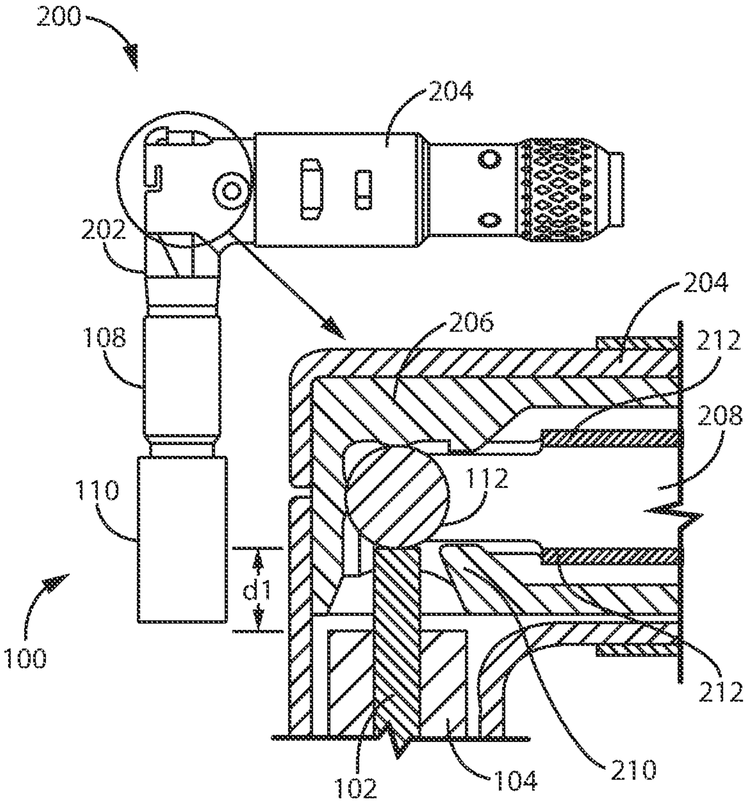
FIG. 2C is a side view of the outer terminal assembly mated with the coaxial cable assembly and a magnified cross-sectional view illustrating the terminal associated with the outer terminal assembly being moved from a stage position to a seated position in contact with the welded contact according to some embodiments.
Figure 2D:
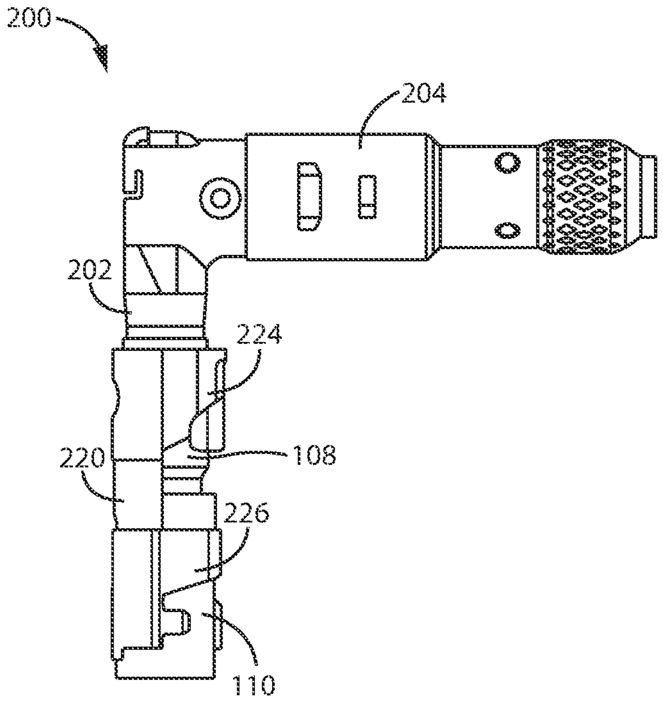
FIG. 2D is a side view illustrating crimping of coaxial cable assembly to the outer terminal assembly according to some embodiments.

FIGS. 2A-2C are side views illustrating installation of the coaxial cable assembly 100 within an outer terminal assembly 200. The outer terminal assembly 200 includes an inner ferrule 202 and a contact assembly 204. In the embodiment shown in FIGS. 2A-2C, the outer terminal assembly 200 is a two-piece assembly, including a contact assembly 204 separate from the inner ferrule 202. In other embodiments these components may be unitary (e.g., one-piece). As discussed with respect to FIGS. 1A and 1B, coaxial cable assembly 100 includes an inner conductor 102, a dielectric insulator 104, a foil shield 106, an outer conductor 108 and a jacket 110. In the embodiment shown in FIGS. 2A and 2B, the contact 112 (in this case, a spherical contact) has already been welded onto the inner conductor 102.

During installation, the welded contact 112, the inner conductor 102, the dielectric insulator 104 and the foil shield 106 are inserted within the inner ferrule 202. The outer conductor 108—having been previously flared as shown in FIG. 2A—is located around the outer surface of the inner ferrule 202.

With respect to FIG. 2B, a magnified cross-sectional view of the outer terminal assembly 200 is shown that illustrates the seating of the welded contact 112 within the outer terminal assembly 200. In the cross-sectional view shown in FIG. 2B, an insulator 206 is located within the outer terminal assembly 200 and is configured to receive the welded contact 112. In some embodiments, the insulator 206 has a geometry configured to receive the geometry of the welded contact 112. For example, if the welded contact 112 is spherical in shape having a first diameter, then the geometry of insulator 206 is configured to have a diameter large enough to receive the welded contact 112. In some embodiments, the insulator 206 may have a feature configured to provide tactile feedback to an operator regarding the seating of the welded contact 112 within the insulator 206. For example, in the embodiment shown in FIG. 2B an insulator lock edge 210 is configured to protrude slightly within the space configured to receive the welded contact 112. The insulator lock edge 210 acts as a detent capable of flexing in response to the contact 112 being inserted within the insulator 206 and then snap back into place, wherein this action provide a tactile response that can be felt by an operator. In the embodiment shown in FIG. 2B, only the welded contact 112 and a portion of the inner conductor 102 extent into the insulator 206, as indicated by the distance d1.

In addition, FIGS. 2B and 2C illustrate the seating of a terminal 208 configured to contact and form an electrical connection with the welded contact 112. FIG. 2B illustrates the terminal 208 in a stage position—not yet in contact with the welded contact 112. FIG. 2C illustrates the terminal 208 in a seated position in which the terminal 208 has been moved into contact with the welded contact 112, thereby providing an electrical connection between the inner conductor 102 and the terminal 208. In some embodiments the terminal 208 has a geometry selected based on the geometry of the welded contact 112. For example, in the embodiment shown in FIGS. 2B and 2C the terminal 208 has a geometry configure to place the terminal 208 in contact with the welded contact 112 but without interfering with the inner conductor 102. For example, the terminal 208 may include a groove 212 located on the bottom of the terminal 208 to prevent contact between the terminal 208 and the inner conductor 102. That is, in this embodiment the inner surface of the terminal 208 contacts the welded contact 112 along the sides of the spherical conductor. In other embodiments, other types of terminals may be utilized to provide an electrical connection between the welded contact 112 and the terminal 208.

Having seated the coaxial cable assembly 100 within the outer terminal assembly 200, the outer conductor is crimped onto the inner ferrule 202 of the outer terminal assembly 200 via outer ferrule 220. In the embodiment shown in FIG. 2D, outer ferrule 220 includes a first crimp portion 224 and a second crimp portion 226. The first crimp portion 224 is wrapped around the outer conductor 108 and crimped to form a mechanical and electrical bond between the outer conductor 108 and the inner ferrule 202. The second crimp portion 226 is wrapped around the jacket 110 and crimped to further secure the coaxial cable assembly 100 to the outer terminal assembly 200.

Figure 3A:
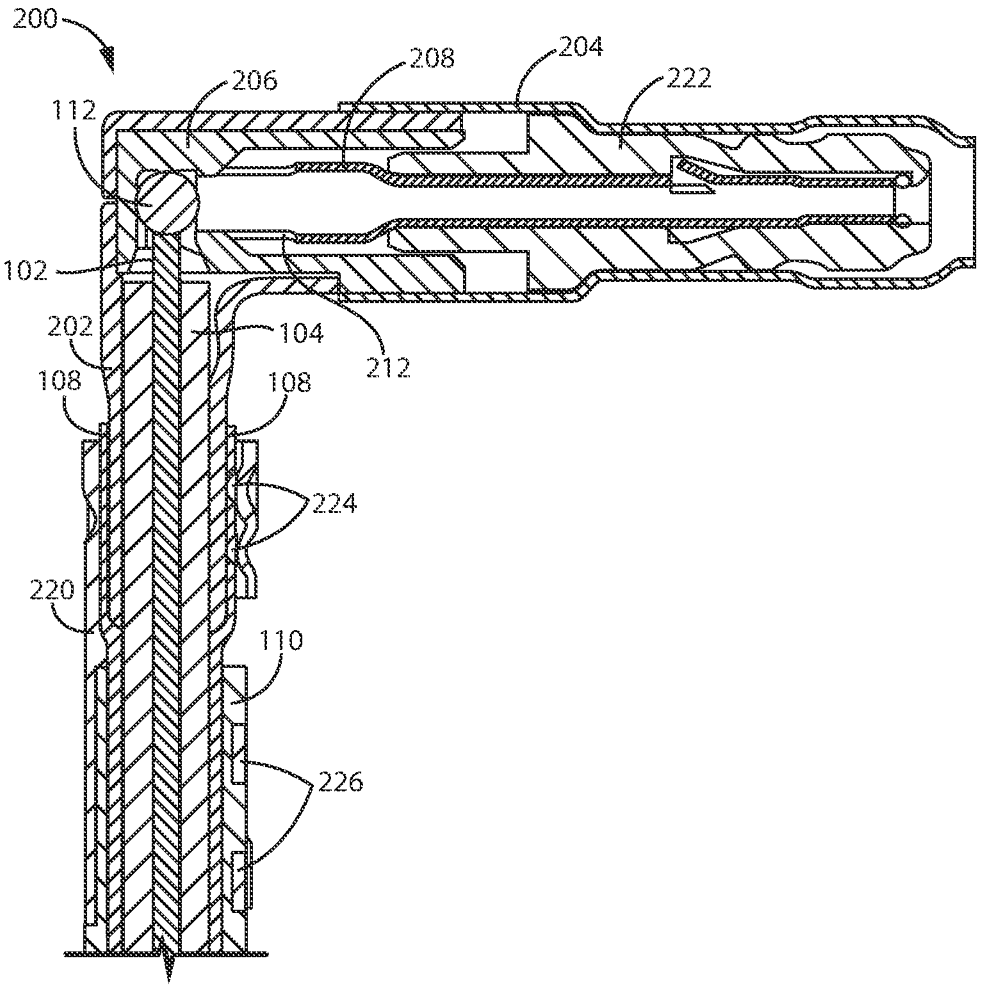
FIG. 3A is a cross-sectional view of the outer terminal assembly that illustrates a a terminal associated with the outer terminal assembly in a stage position according to some embodiments.
Figure 3B:
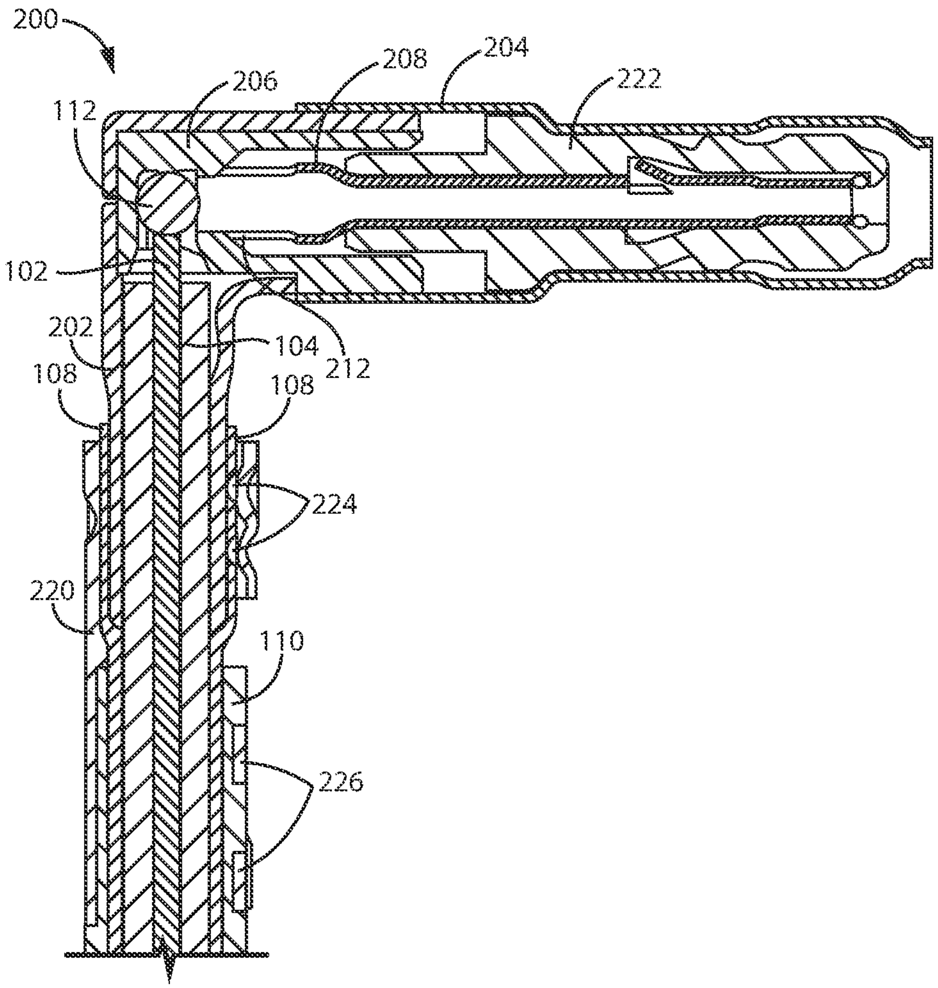
FIG. 3B is a cross-sectional view of the outer terminal assembly that illustrates the terminal associated with the outer terminal assembly in a seated position in contact with the welded contact according to some embodiments.

FIGS. 3A and 3B are cross-sectional views of the coaxial cable assembly 100 seated and crimped within the outer terminal assembly 200 according to some embodiments. In particular, FIG. 3A illustrates the outer conductor 108 crimped onto the inner ferrule 202 by outer ferrule 220. In addition, the outer ferrule 220 is also crimped onto the jacket 108, providing additional mechanical force securing the coaxial cable assembly to the outer terminal assembly 200.

In the embodiment shown in FIG. 3A, the outer terminal assembly 200 includes first insulator 206 and second insulator 222. In some embodiments, second insulator 222 at least partially overlaps the first insulator 206 and surrounds at least a portion of the terminal 208. In the embodiment shown in FIG. 3A, the terminal 208 is in the stage position (i.e., not in contact with the contact 112. Movement of the second insulator 222 in the direction towards the contact 112 causes the terminal 208 to move from the stage position to the seated position in which the terminal 208 is in contact with the contact 112. The embodiment shown in FIGS. 3A and 3B illustrates a "tulip" arrangement with respect to the first and second insulators 206 and 222 and terminal 208, wherein sliding movement of the second insulator 222 causes sliding engagement of the terminal 208 with the contact. In some embodiments, one or more features may be utilized to urge engagement between the terminal 208 and the contact 112.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

According to one aspect, a wire assembly at least an inner conductor and an insulating jacket surrounding the inner conductor, wherein a tip of the inner conductor is exposed at a first end. A contact is welded to the tip of the inner conductor at the first end.

The wire assembly of the preceding paragraph can optionally include, additionally and/or alternatively any, one or more of the following features, configurations and/or additional components.

For example, the contact may be rigid and include a conductive surface.

In some embodiments, the contact may be percussion welded to the inner conductor.

In some embodiments, the contact may be symmetric about an axis, wherein the contact is oriented relative to the coaxial cable for welding to the inner conductor In some embodiments, the contact may be a spherical, non-oriented contact.

In some embodiments, a diameter of the contact may be greater than or equal to a diameter of the inner conductor.

In some embodiments, the cable assembly may be a coaxial cable assembly that further includes a dielectric insulator surrounding the inner conductor, and an outer conductor surrounding dielectric insulator, wherein the insulating jacket surrounds the outer conductor, wherein the outer conductor and the insulating jacket are stripped to expose the dielectric insulator at the first end.

In some embodiments, the outer dielectric insulator may be stripped from the inner conductor to expose a length of the inner conductor.

In some embodiments, the length of the exposed inner conductor may be less than or equal to 0.7 mm.

In some embodiments, the diameter of the contact may be less than or equal to a diameter of the dielectric insulator.

According to another aspect, a coaxial connection assembly includes a coaxial cable and a terminal assembly. The coaxial cable includes an inner conductor, a dielectric insulator, a foil shield, an outer conductor and a jacket, wherein the foil shield, the outer conductor and the jacket are stripped from a first end, wherein at least a tip of the inner conductor is exposed at the first end. A contact is welded to the tip of the inner conductor at the first end. The outer terminal assembly includes a first opening for receiving the first end of the coaxial cable assembly, wherein the outer terminal includes a first insulator located within the outer terminal assembly configured to receive the welded contact of the coaxial cable assembly.

The coaxial connection assembly of the preceding paragraph can optionally include, additionally and/or alternatively any, one or more of the following features, configurations and/or additional components.

For example, the first insulator may include an insulator lock edge that detents in response to the welded contact being seated within the first insulator.

In some embodiments, the outer terminal assembly may further includes a terminal, wherein the terminal is movable between a stage position and a seated position in which the terminal is in contact with the welded contact.

In some embodiments, the outer terminal assembly further includes a second insulator at least partially surrounding the terminal, wherein the second insulator is movable with the terminal between the stage position and the seated position.

In some embodiments, the outer terminal assembly may further include an inner ferrule, wherein at least the welded contact, the inner conductor and the dielectric insulator are received within the inner ferrule, and wherein the outer conductor is placed over the outer ferrule, wherein an outer ferrule is crimped to the outer conductor and the inner ferrule to secure the coaxial cable assembly to the outer terminal assembly.

In some embodiments, the welded contact may be rigid and include a conductive surface, and wherein the welded contact is percussion welded to the inner conductor.

In some embodiments, the dielectric insulator may be stripped at the first end to expose a length of the inner conductor and wherein the length of the exposed inner conductor is less than or equal to 0.7 mm.

In some embodiments, the welded contact may be symmetric about an axis, wherein the welded contact is oriented relative to the coaxial cable for welding to the inner conductor.

In some embodiments, the welded contact may be a spherical, non-oriented contact.

In some embodiments, a diameter of the welded contact may be greater than or equal to a diameter of the inner conductor.

In some embodiments, a diameter of the welded contact may be less than or equal to a diameter of the dielectric insulator.

The invention claimed is:

1. A coaxial cable assembly, comprising:
- an inner conductor having an outer circumferential surface;
- an insulator located around the outer circumferential surface of the inner conductor; and
- a contact welded to a tip of the inner conductor without being in contact with the outer circumferential surface of the inner conductor, the welded contact comprising a first material that is non-compliant and a second material coating the first material that is conductive.

2. The coaxial cable assembly of claim 1, wherein the inner conductor and the insulator are coextensive in length.

3. The coaxial cable assembly of claim 1, wherein a portion of the inner conductor located adjacent to the tip and having a first length in a direction of the longitudinal axis does not include an insulator located around the outer circumferential surface.

4. The coaxial cable assembly of claim 3, wherein the first length is less than 1.0 mm.

5. The coaxial cable assembly of claim 3, wherein the first length is less than 0.7 mm.

6. The coaxial cable assembly of claim 1, wherein the welded contact is a spherical, non-oriented contact.

7. The coaxial cable assembly of claim 6, wherein a diameter of the welded contact is greater than or equal to a diameter of the tip of the inner conductor.

8. The coaxial cable assembly of claim 1, wherein no portion of the welded contact is in contact with the outer circumferential surface of the inner conductor.

9. The coaxial cable assembly of claim 1, wherein the welded contact is conical in shape, with a base of the conical welded contact is welded to the tip of the inner conductor.

10. The coaxial cable assembly of claim 1, wherein the welded contact is percussion welded to the tip of the inner conductor.

11. A coaxial connection assembly, comprising:
- a coaxial cable assembly comprising a contact, an inner conductor, and a dielectric insulator located around an outer circumferential surface of the inner conductor, wherein the contact is welded to a tip of the inner conductor at a first end of the coaxial cable assembly; and
- an outer terminal assembly having a first opening for receiving the first end of the coaxial cable assembly, wherein the welded contact is a spherical, non-oriented contact.

12. A coaxial connection assembly, comprising:
- a coaxial cable assembly comprising a contact, an inner conductor, and a dielectric insulator located around an outer circumferential surface of the inner conductor, wherein the contact is welded to a tip of the inner conductor; and
- an outer terminal assembly having a first opening for receiving the first end of the coaxial cable assembly, wherein the outer terminal assembly includes a first insulator located within the outer terminal assembly configured to receive the welded contact of the coaxial cable assembly, wherein the first insulator includes an insulator lock edge that detents in response to the welded contact being seated within the first insulator.

13. The coaxial connection assembly of claim 12, wherein the outer terminal assembly further includes a terminal, wherein the terminal is movable between a stage position and a seated position in which the terminal is in contact with the welded contact.

14. The coaxial connection assembly of claim 13, wherein the outer terminal assembly further includes a second insulator at least partially surrounding the terminal, wherein the second insulator is movable with the terminal between the stage position and the seated position.

15. A coaxial connection assembly comprising:
- a coaxial cable assembly comprising a contact, an inner conductor, and a dielectric insulator located around an outer circumferential surface of the inner conductor, wherein the contact is connected to a distal tip of the inner conductor located at a first end of the coaxial cable assembly, wherein the contact is not connected to an exterior circumferential surface of the inner conductor, wherein the inner conductor comprises a first material and the contact comprises a second material different from the first material; and
- an outer terminal assembly having a first opening for receiving the first end of the coaxial cable assembly.

16. The coaxial connection assembly of claim 15, wherein the outer terminal assembly further includes an inner ferrule, wherein at least the welded contact, the inner conductor and the dielectric insulator are received within the inner ferrule, and wherein an outer conductor is placed over an inner ferrule, wherein the outer ferrule is crimped to the outer conductor and the inner ferrule to secure the coaxial cable assembly to the outer terminal assembly.

17. The coaxial connection assembly of claim 15, wherein the inner conductor and the dielectric insulator are coextensive in length.

18. The coaxial connection assembly of claim 15, wherein a portion of the inner conductor located adjacent to the tip and having a first length in a direction of the longitudinal axis does not include an insulator located around the outer circumferential surface, wherein the first length is less than or equal to 1.0 mm.

19. The coaxial connection assembly of claim 15, wherein a diameter of the welded contact is greater than or equal to a diameter of the tip of the inner conductor.

* * * * *